(12) United States Patent
Cilliers et al.

(10) Patent No.: US 10,348,069 B2
(45) Date of Patent: Jul. 9, 2019

(54) WINCH AND METHOD OF USE

(71) Applicant: KOBUS SERVICES LIMITED, Tamworth (GB)

(72) Inventors: Jacobus Hendrik Cilliers, Halesowen (GB); Joseph Henry Harris, Warwick (GB)

(*) Notice: Subject to any disclaimer, the term of this patent is extended or adjusted under 35 U.S.C. 154(b) by 143 days.

(21) Appl. No.: 15/521,300

(22) PCT Filed: Oct. 23, 2015

(86) PCT No.: PCT/GB2015/053182
§ 371 (c)(1),
(2) Date: Apr. 24, 2017

(87) PCT Pub. No.: WO2016/063079
PCT Pub. Date: Apr. 28, 2016

(65) Prior Publication Data
US 2017/0338634 A1  Nov. 23, 2017

(30) Foreign Application Priority Data

Oct. 24, 2014  (GB) .................................. 1418974.0

(51) Int. Cl.
*B66D 1/00* (2006.01)
*H02G 1/06* (2006.01)
(Continued)

(52) U.S. Cl.
CPC .............. *H02G 1/06* (2013.01); *B63B 21/16* (2013.01); *B66D 1/00* (2013.01); *B66D 1/14* (2013.01);
(Continued)

(58) Field of Classification Search
CPC .......... B63B 21/16; B66D 3/006; B66D 3/08; B66D 1/22; B66D 1/60; H02G 1/08
See application file for complete search history.

(56) References Cited

U.S. PATENT DOCUMENTS 3,181,302 A * 5/1965 Lindsay ................... E21B 7/30
138/97
4,507,019 A * 3/1985 Thompson .............. E21B 7/046
138/97

(Continued)

FOREIGN PATENT DOCUMENTS

DE          202005020694 U1   7/2006
WO          2008071997 A1     6/2008
WO          2010084340 A2     7/2010

OTHER PUBLICATIONS

Machine translation of description of DE 20 2005 020 694 U1, Jul. 27, 2006.

(Continued)

*Primary Examiner* — Emmanuel M Marcelo
(74) *Attorney, Agent, or Firm* — Pendersen & Company, PLLC; Ken J. Pedersen; Barbara S. Pedersen

(57) ABSTRACT

This invention relates to a winch and to a method of using the winch. The winch is ideally adapted for mounting to the boom of a vehicle such as a mini-excavator, and is likely to find its greatest utility in relation to the removal of underground pipes, electricity conduits, fiber optic cables and the like, as well as in the bursting of pipes. The invention provides a winch comprising a support column, a base, a magazine, a drive mechanism and a mounting structure. The drive mechanism is connected to the magazine and is adapted to rotate the magazine in use. The support column connects the magazine to the base. The mounting structure is adapted for mounting to the boom of a vehicle. The winch has a rotatable connection between the base and the mounting structure which is securable in a chosen rotational position, so that the base of the winch can be correctly aligned regardless of the orientation of the vehicle.

19 Claims, 5 Drawing Sheets

(51) Int. Cl.
 *B63B 21/16* (2006.01)
 *B66D 1/14* (2006.01)
 *B66D 1/60* (2006.01)
 *F16D 3/04* (2006.01)
 *H02G 1/08* (2006.01)

(52) U.S. Cl.
 CPC ............... *B66D 1/60* (2013.01); *F16D 3/04* (2013.01); *H02G 1/08* (2013.01)

(56) References Cited

U.S. PATENT DOCUMENTS

| | | | | |
|---|---|---|---|---|
| 4,736,978 | A | | 4/1988 | Cielker |
| 4,955,755 | A | | 9/1990 | Frey |
| 5,232,205 | A | | 8/1993 | McVaugh |
| 5,314,166 | A | | 5/1994 | Muir |
| 5,328,297 | A | * | 7/1994 | Handford ............... E02F 5/10 405/184 |
| 6,149,349 | A | * | 11/2000 | Nikiforuk ............... E02F 3/963 175/53 |
| 6,394,701 | B1 | * | 5/2002 | Delaforce ............... F16L 55/18 138/97 |
| 6,672,802 | B2 | * | 1/2004 | Putnam ................... B66D 3/006 138/97 |
| 7,025,536 | B2 | * | 4/2006 | Putnam ................... F16L 55/1658 254/29 R |
| 7,048,257 | B2 | * | 5/2006 | Wentworth ............ B66D 1/741 212/296 |
| 7,624,817 | B2 | | 12/2009 | Putnam |
| 7,770,869 | B2 | * | 8/2010 | Tjader .................... B66C 23/66 254/228 |
| 2004/0218982 | A1 | | 11/2004 | Wentworth et al. |
| 2006/0056919 | A1 | * | 3/2006 | Tjader .................... F16L 55/1658 405/184.3 |
| 2010/0067988 | A1 | * | 3/2010 | Tjader .................... F16L 55/1658 405/184.3 |
| 2010/0178113 | A1 | | 7/2010 | Tjader |
| 2011/0272653 | A1 | * | 11/2011 | Cilliers .................. B66D 1/08 254/334 |
| 2012/0093586 | A1 | | 4/2012 | Tjader |

OTHER PUBLICATIONS

PCT International Search Report and Written Opinion, PCT/GB2015/053182, dated Jan. 22, 2016, Applicant: Cilliers.

* cited by examiner

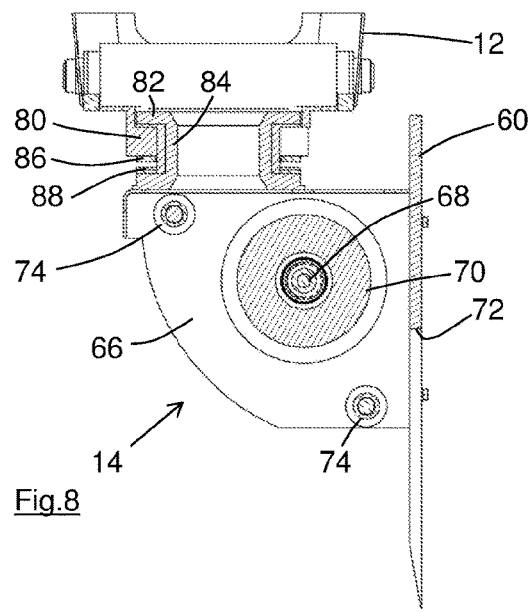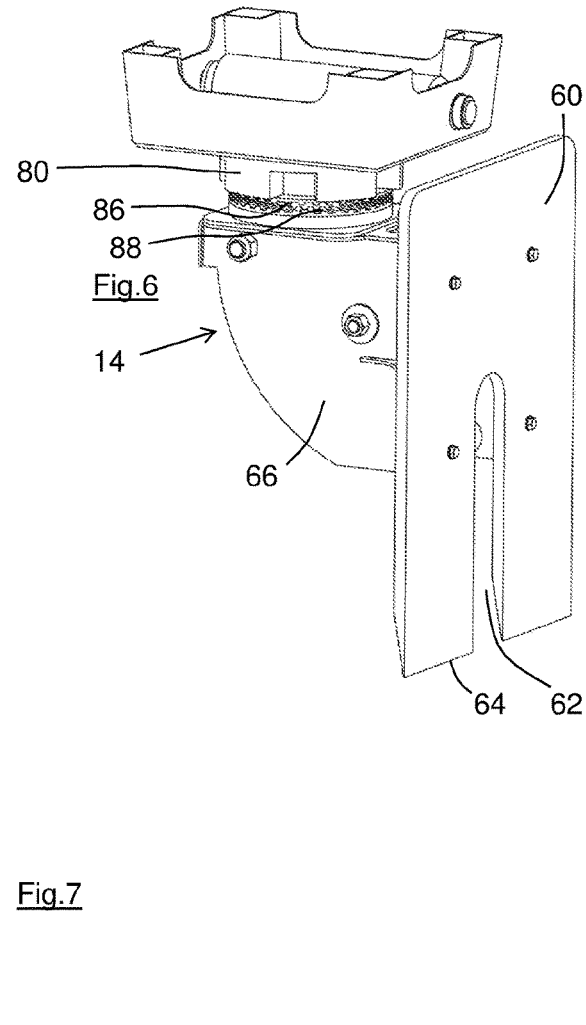

WINCH AND METHOD OF USE

This application is a 371 National Phase entry of PCT/GB2015/053182, with International Filing Date of 23 Oct. 2015, which claims priority of GB 1418974.0, filed 24 Oct. 21014.

FIELD OF THE INVENTION

This invention relates to a winch and to a method of using the winch. The invention relates in particular to a winch adapted for mounting upon a vehicle such as a mini-excavator. The winch is likely to find its greatest utility in relation to the removal of underground pipes such as for gas and water, conduits, cables such as for electricity and fibre optics, and the like, as well as in pipe renovation such as pipe bursting, and the following description relates primarily to such applications. The invention is not however limited to those applications.

In this specification, directional and orientational terms such as "top", "bottom", "below" etc., refer to the components of the winch assembly in their normal orientation of use, as shown for example in FIG. 1.

BACKGROUND OF THE INVENTION

Water, for example, is supplied to domestic and commercial properties by way of large underground (mains) pipes which are laid by the utility suppliers. Smaller pipes connect the mains pipe to the individual building or dwelling. To enable the water supply to be cut off from a particular building (in the event of a leak upon that property), the smaller pipes contain a valve or stopcock, the stopcock usually being located (underground) at the edge of the user's property, for example at the end of the driveway serving the property. Access to the stopcock is provided by way of an access hole.

Waste water is removed from domestic and commercial properties by way of underground waste water pipes, the waste water pipes forming a network joining each property to a waste water treatment facility. Access holes are provided at intervals along the pipe, the larger access holes (for the larger pipes) being manholes which are large enough to accommodate a person.

Other services such as electricity are also often supplied to a building by way of an underground pipe or conduit.

It is periodically necessary to replace an underground pipe, for example a pipe providing water to the property may become insufficient if the water consumption for the property grows beyond the capacity of the pipe. Also, a water or gas supply pipe, or a waste water pipe, may become damaged and start to leak, and so require replacement.

DESCRIPTION OF THE PRIOR ART

One method of replacing an existing pipe is to dig a trench along the line of the pipe and to remove the existing pipe and replace it with a new pipe by way of the trench. Clearly, digging a trench is an expensive and time-consuming activity, and can result in damage to the property and/or to a garden or roadway under which the existing pipe passes.

To avoid the requirement to dig a trench, several trenchless methods for replacing an existing pipe have been developed. In all of these methods it is first necessary to locate the ends of the pipe to be replaced. For example, with a waste water pipe the length of pipe which is to be replaced is identified and an access hole is excavated adjacent to each end (or an existing access hole is used). The pipe is cut so as to open the ends of the length of pipe which is to be replaced. A cable, rod or rope is then passed along the pipe from a first end to the second end. When the cable reaches the second end of the pipe it is secured to a "pipe burster" or "pipe splitter". The pipe burster is also secured to the end of the replacement pipe.

The burster or splitter is a tool which has a tapered leading end and a central portion which is larger than the inside diameter of the existing pipe. The exact form of the splitter will depend upon the material of the existing pipe, but it can for example include a blade to cut open the existing pipe.

To burst the existing pipe, the cable is connected to the pipe bursting equipment and is pulled through the pipe, in turn pulling the pipe burster. The existing pipe is thereby progressively burst as the pipe burster passes therealong, and at the same time is replaced by the replacement pipe.

The requirement to excavate a large hole for the pipe bursting equipment avoids much of the advantage of a trenchless method of replacing the pipe. In addition, the pipe bursting equipment is typically heavy and cumbersome, and must be transported to the site of use on a vehicle, and may need to be inserted into the hole by a crane, so that a roadway or the like is required to allow the required access.

It is also known, especially for the replacement of smaller pipes, to pull the cable by way of a winch located above the ground. Specifically, a winch is located on a trailer and the trailer is manoeuvred over the access hole. The use of a trailer-mounted winch reduces the excavation required. However, such a winch can again only be used in applications where the pipe to be replaced can be accessed by a roadway or the like along which the trailer can be moved.

International patent application WO2008/071997 describes another trenchless method of replacing an existing pipe. In that method, a portable winch is used, the winch having a pulley which can be located in the access hole adjacent to the first end of the pipe, the remainder of the winch mechanism being located above-ground and thereby avoiding or reducing additional excavation.

International patent application WO2010/084340 discloses a portable winch assembly suitable for use in a trenchless method of pipe removal. This winch assembly is constructed from separable components, each of which is light enough to be carried to a site of use if access by a roadway is not available (ideally none of the separable components weights more than 25 kg). Despite this, however, the assembled winch can provide a tensile force of 10 tonnes and can therefore extract and replace underground pipes many meters long.

The present invention is directed to a winch which is also primarily intended for use in trenchless pipe removal/replacement methods. The winch can, however, be used in other applications.

SUMMARY OF THE INVENTION

It is an object of the present invention to provide a winch which can be mounted upon an articulating boom of a vehicle such as an excavator. Excavators are widely used in the construction industry and for earthworks and the like. Many different sizes and types of excavator are available, from many different manufacturers. There are different classes of excavators, including those referred to as backhoe loaders and those referred to mini-excavators (often called mini-diggers) the smallest of which are often called micro-excavators.

Mini-excavators, backhoe loaders and the other vehicles to which the invention is suited all share the feature of a powered articulating arm or boom which can carry one or more removable components. For excavation works the boom will typically carry a shovel attachment so that the vehicle is suited to removing earth. Despite the widespread use of such equipment for excavation, the shovel attachment is typically removable so that another component, dedicated to another task, can be fitted to the boom as required. The winch of the present invention is designed to be a component for removable fitment to the boom of such a vehicle. The winch may therefore be transported to the site of use and positioned at the site of use by the vehicle.

It will be understood that excavators and the like do not usually require roadways for access to a site of use. Many such vehicles have tracks rather than wheels in order to increase their ability to cross soft ground. Some mini-excavators are small enough to pass through pedestrian gateways and other narrow passageways. It is expected that substantially any site at which an underground pipe is located can be accessed by a mini-excavator or another vehicle having an articulating boom.

Making the winch suitable for fitment to the boom of a vehicle such as a mini-excavator avoids the weight limitation placed upon the portable winch assembly of WO2010/084340. However, the vehicle-mounting of the winch presents other problems which the inventor has reduced or overcome with the present invention.

Winches which are designed for fitment onto the boom of an excavator are known but they are not suitable for use for pipe removal. The known winches which are able to provide sufficient force to pull an existing pipe from the ground are large and require the excavation of a large access hole. There are, however, instances where an existing access hole is to be used for trenchless pipe removal, and the known winches cannot pass through the manhole of an existing access hole. Even if the access hole is large enough to accommodate the winch, the boom is often not able to lower the winch to the depth of the existing pipe. In both cases, the operator may seek to remove the existing pipe by locating the winch above ground and applying a tensile force which is not aligned with the existing pipe; this increases the force required to remove the pipe and will likely result in damage to the access hole and its surroundings.

The inventor has therefore sought to provide a winch which is able to be mounted upon the boom of a vehicle such as an excavator, which avoids or reduces the above-stated problems with the known winches, and which avoids or reduces the problems associated with the use of a vehicle-mounted winch.

According to the invention, there is provided a winch comprising a support column, a base, a magazine, a drive mechanism and a mounting structure, the drive mechanism being connected to the magazine and being adapted to rotate the magazine, the base being adapted for insertion into an access hole adjacent to the end of a pipe to be removed, the support column connecting the magazine to the base, the mounting structure being adapted for mounting the winch upon the boom of a vehicle, the winch having a rotatable connection between the base and the mounting structure.

The present winch therefore differs from the existing winches which are adapted for fitment to the boom of a vehicle primarily by including a support column and a base. It is therefore only necessary to insert the base and (part of) the support column into the access hole. In particular, the access hole does not need to accommodate the magazine and drive mechanism and can therefore be smaller. The support column can be sufficiently long to ensure that the base can lie alongside the end of the pipe to be removed, so ensuring that the tensile force can be aligned approximately (or ideally precisely) with the existing pipe.

The invention differs from the winch of WO2010/084340 (and also from the existing winches) in having a rotatable connection between the mounting structure and the base. For a known winch mounted upon a vehicle the location (and in particular the orientation) of the base will be determined by the location of the vehicle. It may be that the vehicle access is limited, perhaps by an adjacent building or the like. A rotatable connection between the base and the vehicle allows the base to be correctly oriented within the access hole relative to the existing pipe, regardless of the position of the vehicle.

The support column has a longitudinal axis and the rotatable connection preferably allows the base to rotate relative to the column about a single rotational axis which is parallel with (and perhaps coincident with) the longitudinal axis. Provided that the boom of the vehicle can be positioned above the access hole with the longitudinal axis of the support column substantially vertical, the base can be rotated about the rotation axis into alignment with the pipe.

Alternatively, the base can rotate relative to the mounting structure about a plurality of axes, ideally two perpendicular axes, one of the axes being parallel with the longitudinal axis of the support column and the other axis being perpendicular to the longitudinal axis. Such an arrangement provides greater adjustment and in particular permits the base to be correctly aligned within the access hole even if the support column cannot be oriented vertically. In a further alternative arrangement the base can be mounted upon a ball joint or the like to provide a range of universal rotational adjustment of the base relative to the mounting structure.

Desirably, the rotatable connection is located between the base and the support column. This permits the orientation of the support column relative to the magazine to be fixed.

Preferably, the rotatable connection is securable in a chosen rotational position, and ideally is transferable between a rotatable condition and a non-rotatable condition. Preferably also, the base is movable relative to the support column between the rotatable and non-rotatable conditions. Desirably, the base is movable relative to the support column in the direction of the longitudinal axis of the support column. Desirably also, the base is closer to the magazine when in its non-rotatable condition than in its rotatable condition. Such an arrangement allows the base to be in its rotatable condition when it is suspended from the boom and for example held above the access hole, the weight of the base causing it to move downwardly (i.e. away from the magazine) relative to the support column. The operator can then rotate the base to its desired orientation in the access hole. On the other hand, however, when the base is lowered into the access hole and engages the bottom of the access hole so that its weight is supported by the earth at the bottom of the access hole rather than by the support column, the base is moved towards the magazine into its non-rotatable condition.

It is desirable that the base is in its non-rotatable condition whilst the existing pipe is being pulled from the earth. It is possible that the earth adjacent one part of the access hole is softer than the earth adjacent another part of the access hole; when tension is applied to remove the existing pipe a rotatable base could be forced to twist or otherwise deviate as it is forced against the earth surrounding the access hole.

Any such deviation is disadvantageous as it is desired to maintain the direction of the tensile force closely aligned with the existing pipe.

Preferably, the rotatable connection comprises a set of teeth mounted upon the support column and a cooperating set of recesses mounted on the base (or vice versa). When the respective teeth and recesses inter-engage the base is held against rotation relative to the support column, but when the respective teeth and recesses are separated the base is substantially freely rotatable relative to the support column. The recesses can be provided between adjacent teeth so that the base and support column both carry a set of cooperating teeth.

Preferably, the magazine comprises a first end plate and a second end plate, the end plates being separable. Preferably also the magazine comprises a shaft between the end plates, the shaft having a first part connected to the first end plate and a second part connected to the second end plate. Desirably one of the shaft parts has a threaded boss and the other shaft part has a threaded recess whereby the shaft parts can be joined together. Such an arrangement allows the first end plate and first shaft part to be fixed (and ideally substantially permanently fixed) to the drive mechanism thereby avoiding the likelihood of failure caused by relative movement between those components. It also allows the waste or spoil (comprising the removed existing pipe and the removal cable) to be separated from the magazine by removing the second end plate and second shaft part.

Preferably, the outer surface of the first shaft part is tapering and the outer surface of the second shaft part is tapering, the respective shaft parts being widest adjacent to the respective end plate and narrowest adjacent to the position when the shaft parts meet. Such an arrangement facilitates the removal of the spoil. The taper angle is preferably between 10 and 20°, desirably between 12 and 17°, and ideally 14°.

Preferably, the second shaft part has the threaded boss and the first shaft part has the threaded recess. Desirably the threaded boss and the threaded recess have (unthreaded) cooperating engagement surfaces adapted to bear at least part of the load during use. Preferably the cooperating engagement surfaces are tapered, with a taper angle of between 15° and 45°, and ideally around 30°.

Desirably, the base includes a face plate and a pulley. The face plate has an opening to accommodate the existing pipe. In use the winch cable and the existing pipe pass partially around the pulley so that the approximately vertical force applied by the drive mechanism and magazine is converted into a substantially horizontal force acting upon the existing pipe. Preferably, the opening is open-ended and in particular is open to the bottom edge of the face plate. Desirably also, the bottom edge of the face plate is relatively sharp, allowing the face plate to be pressed down into the earth below the existing pipe. In use, therefore, the base can be suspended above the access hole and rotated until the pulley is closely aligned with the existing pipe. The winch is then lowered by way of the articulating boom of the vehicle so that the opening in the face plate passes over the exposed end of the existing pipe. The base is pressed down by the excavator until the bottom of the pulley is approximately aligned with the existing pipe. During this latter stage the face plate can be pressed into the earth at the bottom of the access hole and it is therefore not necessary to excavate an access hole to the depth of the face plate. In practice, the access hole needs only to be excavated to a depth sufficient to expose and allow the cutting of the existing pipe.

BRIEF DESCRIPTION OF THE PREFERRED EMBODIMENTS

The invention will now be described in more detail, by way of example, with reference to the accompanying drawings, in which:

FIG. 6 is a perspective view of the bottom of the support column and the base of the winch;

FIG. 7 is a side view of the components of FIG. 6;

FIG. 8 is a sectional view of the components of FIG. 6, through the centre of the pulley;

DETAILED DESCRIPTION

Figure 1:
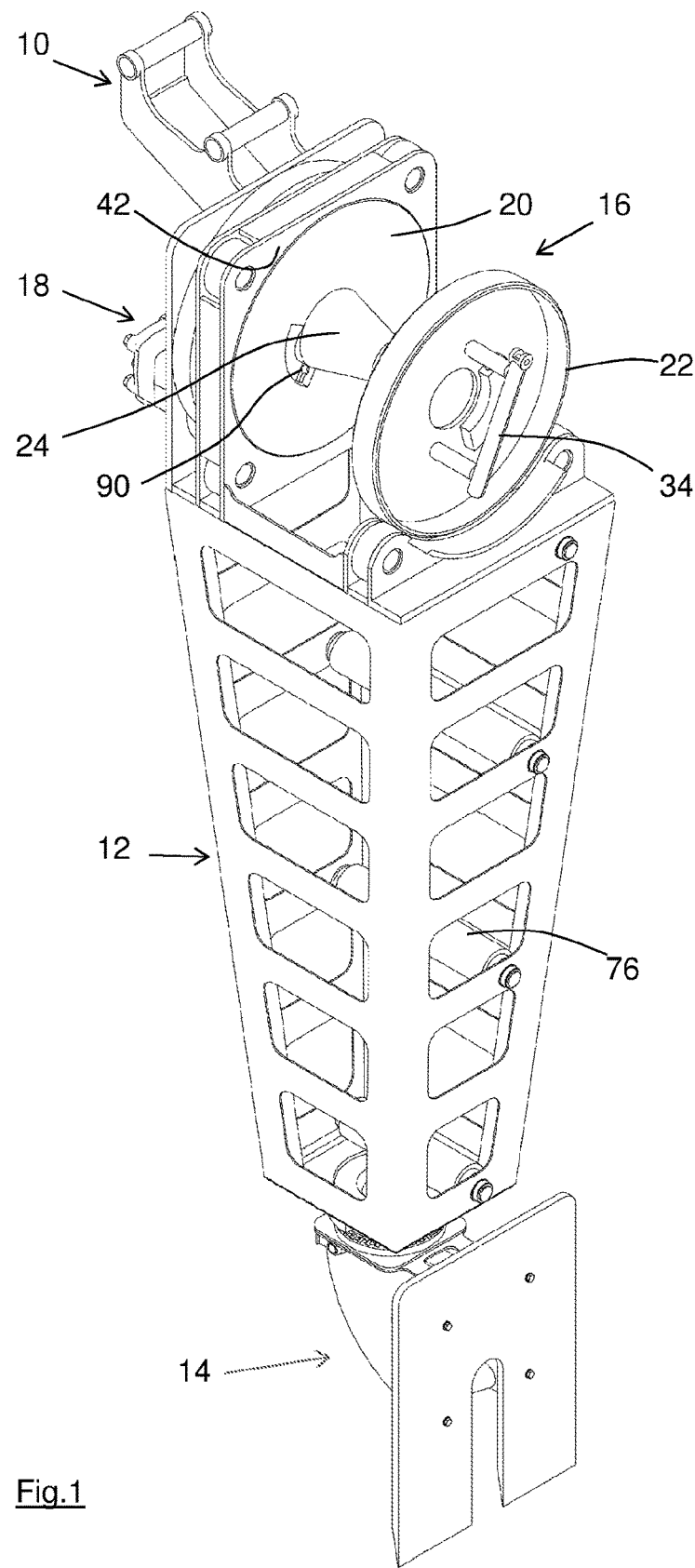
FIG. 1 is a perspective view of a winch according to the present invention.

The winch comprises a mounting structure 10, a support column 12, a base 14, a magazine 16 and a drive mechanism 18. As described below the drive mechanism 18 is connected to the magazine 16 and can drive the magazine to rotate.

The base 14 is designed for insertion into an access hole which has been excavated (or is already available) at the work site, for example adjacent to the end of a pipe to be removed (neither the access hole or the pipe is shown in the drawings). The support column 12 separates the magazine 16 from the base 14 and avoids the requirement for the magazine 16 and drive mechanism 18 to be inserted into the access hole. Thus, in practice it is arranged that the support column 12 is sufficiently long so that the base 14 can be inserted adjacent to the end of the pipe to be removed with the magazine 16 and drive mechanism 18 above ground level.

Winches having support columns of different lengths and being suited to different depth pipes can be provided. Alternatively, the support column can be adjustable in length, for example being telescopic or assembled in sections with additional sections being inserted to increase the length of the support column, as desired.

The winch is designed to be connected to the articulating boom of a vehicle such as an excavator. The vehicle is not shown but it will be understood that the articulating boom will typically have a connecting structure allowing the temporary fitment of different components. The components are fitted with a common mounting structure 10 which cooperates with the connecting structure of the boom to allow the component to be lifted and manipulated by the boom. The configuration of the connecting structure, and therefore the necessary configuration of the mounting structure 10, can be unique to a manufacturer or to a particular vehicle. It can be arranged that a winch according to the invention is designed for use with a particular vehicle (or range of vehicles), in which case the mounting structure 10 is permanently connected to the remainder of the winch.

Alternatively, it can be arranged that the mounting structure 10 is removable from the remainder of the winch, and can be replaced by another dedicated mounting structure suited to the connecting structure of another vehicle.

Figure 2:
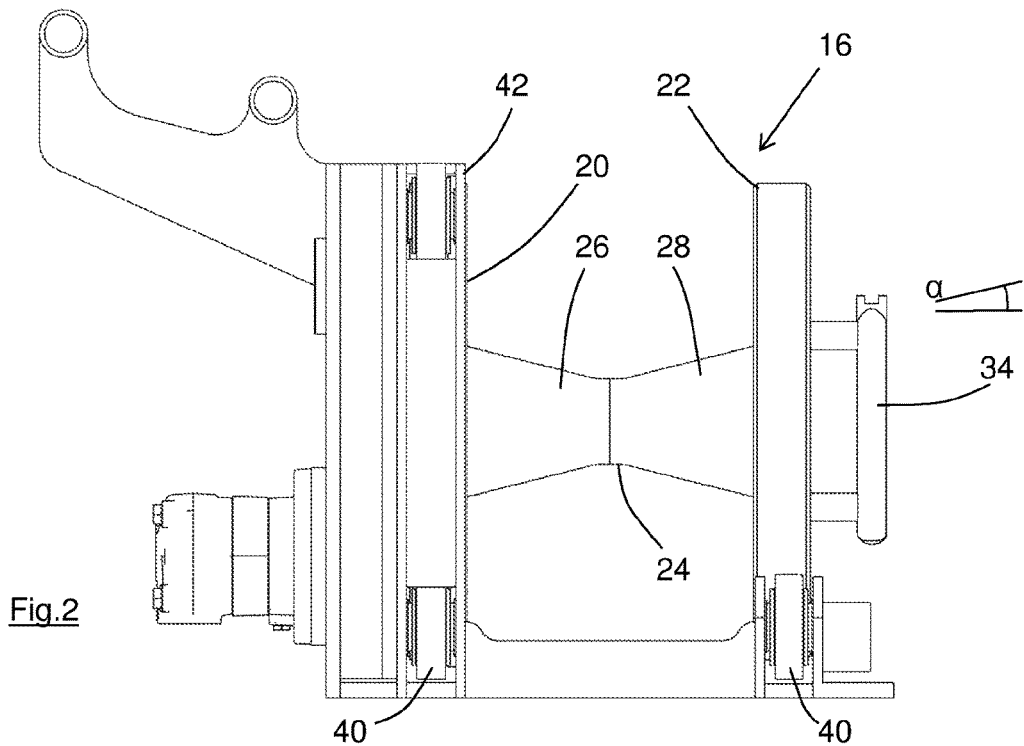
FIG. 2 is a side view of the upper part of the winch including the magazine and drive mechanism.
Figure 3:
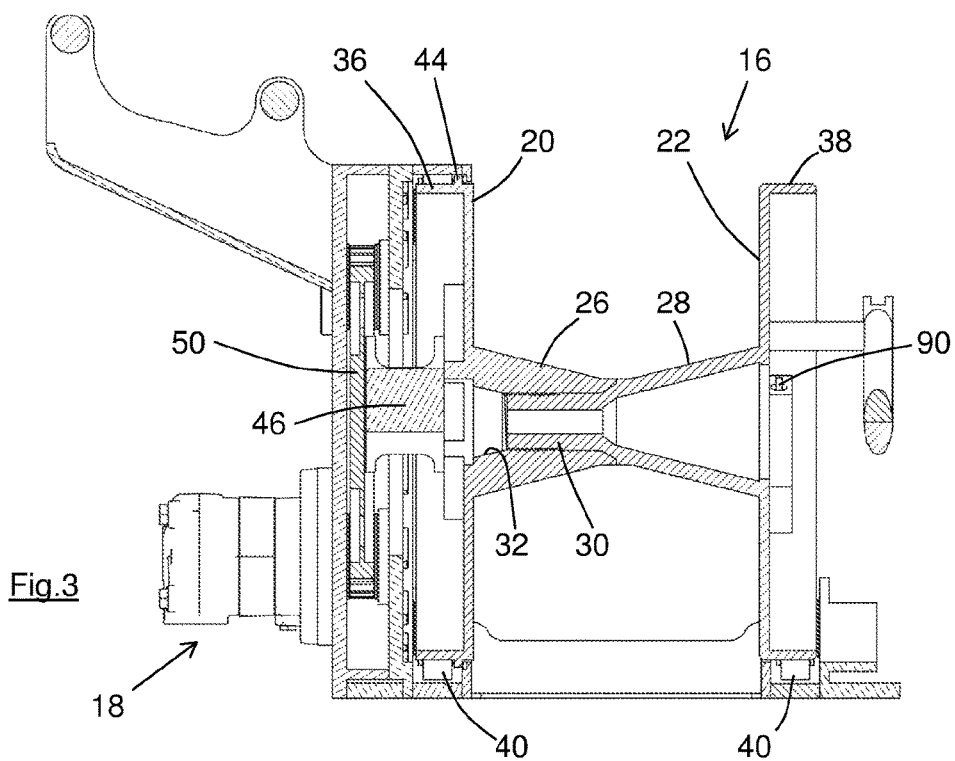
FIG. 3 is a sectional view of the upper part of the winch, through the centre of the magazine.

As shown in more detail in FIGS. 2 and 3, the magazine 16 comprises a first end plate 20 and a second end plate 22, with a shaft 24 therebetween. The shaft is in two parts, with the first shaft part 26 (permanently) connected to the first end plate 20 and a second shaft part 28 (permanently) connected to the second end plate 22. As seen in FIG. 3 in particular, the shaft parts 26, 28 (and thereby the end plates 20, 22) are connected together by way of cooperating screw threads located on a boss 30 of the second shaft part 28 which locates within a recess 32 in the first shaft part 26.

The threaded connection between the first shaft part 26 and the second shaft part 28 is sufficiently robust to withstand the torque applied during use (for example 19 kN), and is designed to be fitted and tightened by hand.

In addition to the threaded portion, it will be seen that the boss 30 has a non-threaded region which is a sliding fit into a non-threaded region of the recess 32. These non-threaded regions are sufficiently robust to withstand the forces involved during use in the event that the shaft parts are insufficiently tightened by the operator, for example if there is only a limited connection between the threaded parts.

The screw thread is a clockwise screw thread, and it will be understood that when the magazine 16 is driven to rotate by the drive mechanism during the extraction of an existing pipe the direction of rotation acts to further tighten the cooperating screw threads.

The outer surface of the first shaft part 26 and the outer surface of the second shaft part 28 are tapered, in this embodiment by a taper angle $\alpha$ (both shaft parts in this embodiment having the same taper angle). The taper angle $\alpha$ is 14°, which has been found to be a suitable angle to ensure that the spoil can be removed from the magazine at the end of the procedure.

It will be seen from FIG. 3 that the end plates 20, 22 each have a respective circular peripheral rim 36, 38. The winch has rollers 40 upon which the peripheral rims are supported, the rollers rotating as the magazine is rotated in use.

The peripheral rim 36 of the first end plate 20 is located behind a protective cover 42 and so is not visible in FIG. 1. As seen in FIG. 3, however, the peripheral rim 36 has two circumferential ridges 44 which lie to opposing sides of the roller 40 and thereby retain the first end plate 20 in position relative to the roller 40. The peripheral rim 38 has no such ridges, however, and so can be slid to the right as drawn in FIGS. 2 and 3 relative to its rollers 40 as the second shaft part 28 is separated from the first shaft part 26.

Figure 4:
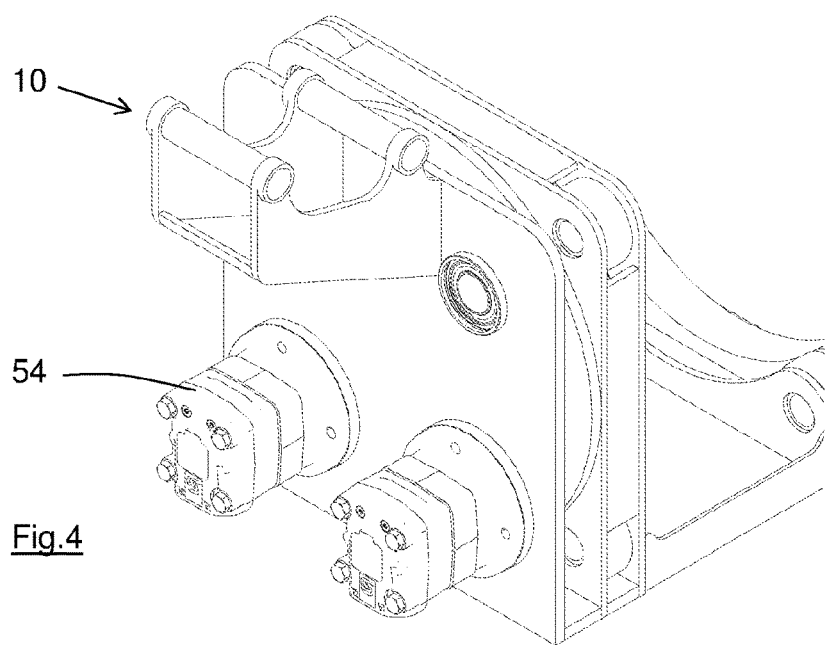
FIG. 4 is a perspective view of the upper part of the winch, with part of the magazine removed.
Figure 5:
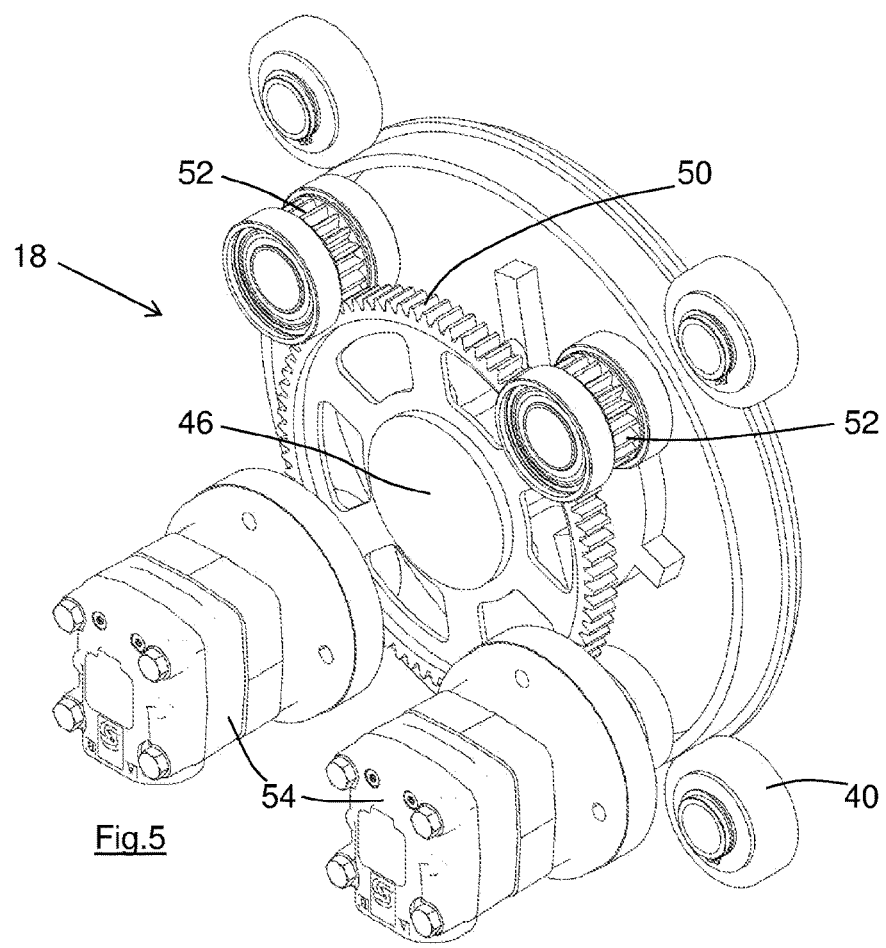
FIG. 5 is a view of the drive mechanism of the winch.

The drive mechanism 18 is shown in more detail in FIGS. 4 and 5. The first shaft part 26 is joined to the hub 46 of a gear wheel 50. The gear wheel 50 has a set of peripheral gear teeth which engage respective idler gears 52. The teeth also engage two drive gears (not seen) which are connected to the respective output shafts of two drive motors 54. The drive motors 54 are hydraulic motors which can be connected to the hydraulic system of the vehicle, or they can have their own hydraulic power pack, as desired.

The idler gears 52 keep the gear wheel 50 in mesh with the drive gears, which avoids the requirement for bearings around the shaft 46.

Two hydraulic motors are used in this embodiment, but it will be understood that three or four hydraulic motors could be used if desired (by replacing the idler gears 52 by respective drive gears connected to the additional motors). Also, more than four hydraulic motors could be provided if desired. Tests have shown that two hydraulic motors 54 can provide a combined torque in excess of 19 kN which translates into a tensile force of 20 tonnes upon a cable within an underground pipe.

It will be observed that engaging the gear teeth at the periphery of the gear wheel 50 provides a geared reduction in rotational speed of the magazine, and also increases the tensile force which can be applied. A larger tensile force can thereby be applied than would be the case if the drive was located at the hub 46, for example.

FIGS. 6-8 show the bottom end of the support column 12 and the base 14. The base 14 comprises a face plate 60 with an open-ended opening 62. The bottom edge 64 of the face plate 60 is relatively sharp. The base plate comprises a pair of side plates 66, between which is mounted an axle 68 for the pulley 70.

The side plates 66 also mount the shafts of two rollers or guides 74, the existing pipe passing between the pulley 70 and the guides so that the guides ensure that the existing pipe bends as it passes around the pulley 70. Without the guides, it has been found that the distal end of the existing pipe can seek to remain substantially straight as it is pulled from the earth. A straight length at the end of the existing pipe can damage the earth surrounding the access hole, and can also act to lift the winch out of the access hole. The lower roller 74 cooperates with the pulley 70 to bend the pipe around the pulley, and the upper roller 74 helps to subsequently straighten the pipe.

It will be seen that the support column has four rollers or guides 76, which also act to prevent the end of the removed pipe from seeking to remain straight as it is wound onto the magazine.

According to the invention there is a rotatable connection between the base 14 and the mounting structure 10, so that the base 14 can rotate relative to the mounting structure about a (single) rotational axis A-A (FIG. 7) which is substantially parallel to (and in this embodiment also coincident with) the longitudinal axis of the support column 12.

It will be seen that the axes of the rollers or guides 76 are aligned with the rotational axis of the magazine, and so in this embodiment the rotatable connection is located between the support column and the base. In other embodiments the rotatable connection is located between the magazine and the support column, in further alternative embodiments the rotatable connection is located between the mounting structure and the support column, and in yet further alternative embodiments the rotatable connection is located between the ends of the support column.

The bottom end of the support column 12 has a circular boss with an inwardly-directed flange 80 (or specifically a set of part-circular bosses and inwardly-directed flanges). The flange 80 overlies and retains the top flange 82 of a C-section ring 84 of the base 14. The bottom edge of the flange 80 carries a set of first teeth 86 and the top edge of the bottom flange of the C-section ring carries a set of cooperating second teeth 88.

In an alternative embodiment the (continuous) flange 82 could be replaced by a set of part-circular flange elements, the gaps between the flange elements allowing easier removal of soil or other debris.

As seen in FIG. 8 the separation of the flanges of the C-section ring 84 is greater than the thickness of the flange 80, so that the C-section ring 84 can move (in the direction along the axis A-A) relative to the flange 80. When the winch is being supported by the boom of the vehicle and the base 14 is suspended beneath the support column 12, the weight of the base causes the top flange 82 of the C-section ring to rest upon the flange 80 as shown in FIGS. 6-8. In this position the teeth 86 are out of engagement with the teeth 88 and the base can rotate about the axis A-A relative to the support frame (with the top flange 82 sliding around the flange 80). However, when the base 12 is not suspended, i.e. it is pressed against the bottom of an access hole, the teeth 86 engage the teeth 88 and rotation is prevented. Also, when in use the tension in a cable and pipe act to press the teeth 86, 88 into engagement.

The cooperating teeth 86, 88 therefore prevent rotation of the base relative to the support column (and mounting structure) during use. This is beneficial as it helps to ensure that the alignment of the base is maintained even if the earth to one side of the face plate is softer than at the other side of the face place.

In this embodiment the teeth 86, 88 are square-edged as seen in FIGS. 6 and 7 (i.e. with edges aligned with the longitudinal axis A-A), but the teeth could alternatively be V-shaped. Square edged teeth are preferred, however, so that any force seeking to rotate the base 14 relative to the support column 12 does not act to separate those components. A large number of teeth are provided so that there are many available rotational positions, each separated by only a few degrees. For example, a set of seventy two teeth 86, 88 will provide an angular separation of 5° between adjacent secured positions.

In other embodiments the base is also rotatable about a second axis, for example an axis aligned with the axle 68, to provide greater adjustment of the orientation of the base relative to the mounting structure. Two-axis adjustment could enable the correct alignment of the base within the access hole even if the support column cannot be positioned with its longitudinal axis substantially vertical. In yet other embodiments a ball joint could replace the connection between the support column and base to provide yet greater adjustment.

In all embodiments, the cooperating set of teeth providing incremental adjustment can be replaced, for example by continuous sliding surfaces providing a continuous range of relative movement. Such a universal rotational connection can if desired be locked in a chosen rotational position a brake, for example a hydraulic brake controlled from the vehicle.

To operate the winch according to the present invention, the winch is first fitted (by way of the mounting structure 20) to the articulating boom of a vehicle (not shown). If desired, the hydraulic system of the vehicle is connected to the motors 54. The winch is then transported to the location of use, where an access hole has been excavated to expose the existing pipe which is to be worked on. Importantly, only a relatively small access hole is excavated, sufficiently large to accommodate the base 14 and support column 12, and only to a depth necessary to expose the existing pipe and allow the existing pipe to be cut through to create an open end. In one embodiment the face plate 60 is approximately 30 cm wide, and the access hole may be of substantially square cross-section with sides little more than 30 cm across.

The vehicle is positioned so that the longitudinal axis A-A is substantially vertical with the base 14 suspended a small distance above the access hole. The base 14 is rotated so that the pulley is closely aligned with the existing pipe and the winch is moved so that the face plate is aligned with the edge of the access hole from which the existing pipe is projecting.

In common with the method of WO2008/071997, when used for pipe removal, a cable (not shown) is fed along the existing pipe, the cable having a removal component attached to its distal end, and ideally having a replacement pipe connected to the removal component. The proximal end of the cable is fitted with an enlarged lug, key or the like. The proximal end of the cable is fed between the guides 74 and the pulley 70, up the support column and around the magazine 16. It will be seen from FIGS. 1 and 3 that the end plates 20, 22 each have a keyhole formation 90, the enlarged end of the keyholes being large enough to accommodate the lug at the proximal end of the cable. The cable is slid into the narrower part of the keyhole so as to secure the proximal end of the cable to the magazine 16. If desired, the operator may wind the cable around the magazine a number of times before securing the lug.

The lug is preferably fitted into the keyhole 90 of the second end plate 22, which avoids the operator having to fully tighten the shaft parts 20,22 prior to activation of the drive mechanism. It will be understood that when the drive mechanism is activated the tension in the cable initially resists rotation of the second shaft part 28 and the relative rotation between the shaft parts tightens the second shaft part 22 against the first shaft part 20.

It will be understood that the method of connection of the cable to the magazine 16, and the location of that connection, can be varied without departing from the invention.

The winch 10 is lowered so that the base 14 enters the access hole, with the face plate preferably engaging the edge of the access hole. As the base is moved down into the access hole, the operator ensures that the end of the existing pipe enters the opening 62, and also ensures that the cable does not foul any part of the base. The vehicle drives the base down so that the face plate digs into the earth beneath the access hole, the sharp bottom edge 64 facilitating that step.

It will be understood that the face plate 60 is only suitable if there is earth below the access hole into which the bottom of the face plate can be driven. If there is an obstruction below the existing pipe then an alternative face plate should be used (for example a face plate arranged in landscape rather than portrait orientation). In any event, the face plate should have an area large enough to spread the reaction force over a sufficiently large area to reduce the likelihood that the face plate is pulled into the earth surrounding the access hole. Also, the aperture in the face plate should be located so that the existing pipe passes through the approximate centre of the face plate in order to minimise the offset forces during use.

The base 14 is moved down until the bottom of the roller 70 is aligned with (and preferably engages) the existing pipe.

The drive mechanism is then actuated and the magazine is rotated. The cable becomes taut and tension is applied to the existing pipe to pull it from the earth. The guides 74 cause the existing pipe to bend as it passes around the pulley 70, and then subsequently to straighten as it passes up the support column 12. The pipe is then bent again as it is wound around the magazine 16.

When the existing pipe has been removed and is fully wound around the magazine 16, the drive mechanism 18 is stopped. The second shaft part 28 is then released from the first shaft part 26, allowing the spoil to be removed from the magazine for disposal. In a preferred method of operation, before the second shaft part 28 is removed the articulating boom of the vehicle is manipulated to lift the winch from the access hole and to reorient the winch so that the first shaft part 26 projects upwardly. Consequently, when the second shaft part 28 is removed the spoil remains relatively securely upon the tapering cone of the first shaft part 26 allowing it to be transported safely by the vehicle to a skip or the like where it can be tipped off the first shaft part 26.

It will be observed that the second shaft part 28 is the male component and this is preferred so that when removing of the spoil from the magazine it is not necessary to pass the spoil over the end of the threaded boss (this also avoids the likelihood of damage to the threads during removal of the spoil). This does, however, increase the weight of the second shaft part, and so the weight of this part should be minimised to reduce the difficulty of its removal and subsequent re-attachment.

In the event that the threads have become so tight that the second shaft part 28 cannot be released from the first shaft part 26 by manual rotation by way of the operating handle 34, the operating handle 34 is pivoted outwardly and the drive mechanism 18 is operated slowly in reverse. The operating handle 34 rotates with the magazine and is positioned to engage a fixed part of the winch, whereupon further reverse rotation of the first shaft part 26 causes the second shaft part 28 to be forcibly unscrewed.

Figure 9:
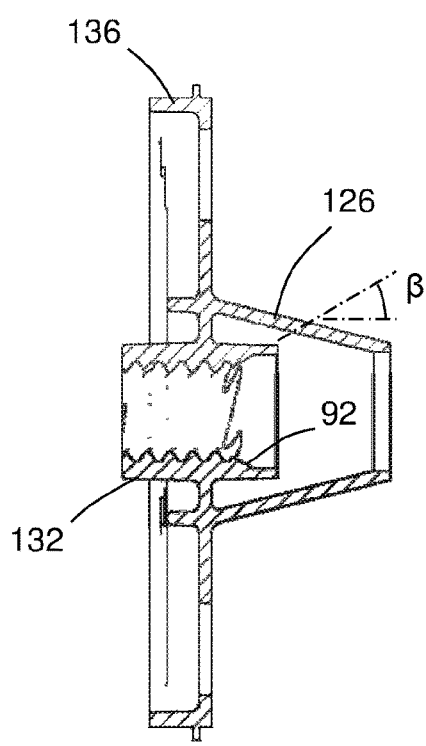
FIG. 9 shows an alternative embodiment of a first end plate and first shaft part.
Figure 10:
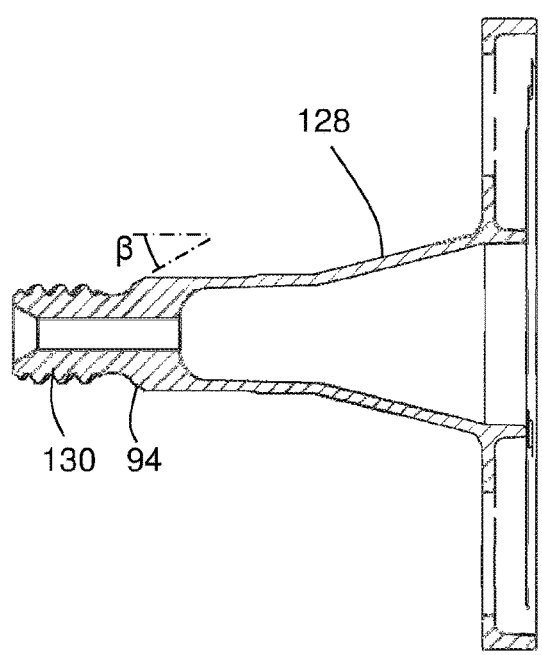
FIG. 10 shows an alternative embodiment of a second end plate and second shaft part.

The first shaft part 126 and the second shaft part 128 in the alternative embodiment shown in FIGS. 9 and 10 have a slightly modified connection arrangement. This modified connection arrangement has been developed to seek to maximise the load which the shaft parts (and in particular the connection therebetween) can accommodate whilst still allowing the separation of the shaft parts without undue force being required.

It will be seen in comparison with FIG. 3 that the threads of the recess 132 are closer to the first end plate 136, and in this embodiment project beyond the first end plate (so that at least part of the recess 132 lies to the left of the first end plate 136 as viewed. The tapered outer surface of the first shaft part is provided by a sleeve which surrounds and is separate from the recess 132. Together, these modifications increase the length over which the boss 130 is supported without unduly increasing the size (width as viewed), and therefore the weight, of the first shaft part 126. The boss 132 of the second shaft part 130 is correspondingly longer than the boss of the embodiment of FIGS. 2 and 3.

In addition, it has been found beneficial to include cooperating engagement surfaces 92, 94 on the first and second shaft parts 126, 128 which are tapered at an angle β. Tests have demonstrated that the provision of a connection arrangement as shown in FIGS. 9 and 10, with tapering engagement surfaces 92, 94 immediately adjacent to the threaded sections, provide a magazine which can withstand tensile loads of 20 tonnes and yet avoids the threads locking during use. It has been found that a taper angle β of 30° is suitable.

A taper angle β of between around 15° and around 45° is expected to be effective, noting that a shallower angle results in the engagement surfaces being longer and therefore the first and second shaft parts being heavier for a given material, and also increases the likelihood of lock-up. A steeper angle reduces the loads which can be borne by the cooperating surfaces, requiring more of the load to be borne directly by the threads.

It will be understood that the winch components (other than the second shaft part 22) do not need to be portable as is the case with the winch of WO 2010/084340 (the second shaft part 22 with its end plate 28 should be portable, ideally weighing less than 25 kg). The components and their interconnections are made to be sufficiently robust to withstand damage as might be caused by a careless excavator driver.

Whilst the use of the invention has been described in relation to the removal of an existing pipe by way of a cable passing along the pipe, it will be understood that the winch could be used for cables directly, i.e. for pulling electrical or fibre-optic cables from the earth or from their conduits.

Also, the invention can be used for the re-rounding of underground pipes such as drains. If a part of drain has collapsed, for example, it is known to pull a cone through the pipe which acts to force the pipe back to its original shape. A liner is subsequently passed along the pipe and remains in place to maintain the shape of the repaired pipe.

For use with the re-rounding of pipes, and for the removal of electrical or fibre-optic cables, it may be desirable not to wind the cable onto the magazine but instead to use the magazine as a capstan. This is particularly advantageous if the cable is to be re-used as winding a cable around the magazine of a winch can damage the cable. The tapering form of the shaft parts makes the magazine suitable for use as a capstan, and a guide (suitably in the form of a loop through which the cable is passed) can be provided ahead of and beyond the magazine to guide the cable onto and off from the capstan.

The invention claimed is:

1. A winch comprising a support column, a base, a magazine, a drive mechanism and a mounting structure, the drive mechanism being connected to the magazine and being adapted to rotate the magazine in use, the support column connecting the magazine to the base, the mounting structure being adapted for mounting to a boom of a vehicle, the winch having a rotatable connection between the base and the mounting structure, the rotatable connection having a number of cooperating teeth and recesses providing multiple chosen rotational positions of the base relative to the mounting structure in which the rotatable connection is securable.

2. The winch according to claim 1 in which the angular separation between adjacent chosen rotational positions is approximately 5°.

3. The winch according to claim 1 in which the cooperating teeth are square-edged.

4. The winch according to claim 1 in which the support column has a longitudinal axis and the rotatable connection allows the base to rotate relative to the mounting structure about a rotational axis which is substantially parallel with the longitudinal axis.

5. The winch according to claim 1 in which the rotatable connection is located between the base and the support column.

6. The winch according to claim 5 in which the base is movable relative to the support column between a securing position and an unsecuring position, the rotatable connection being non-rotatable in the securing position and rotatable in the unsecuring position.

7. The winch according to claim 6 in which the base is movable towards and away from the magazine.

8. The winch according to claim 7 in which the base is closer to the magazine when in its securing position than in its unsecuring position.

9. The winch according to claim 1 in which the magazine has a first end plate and a second end plate, the end plates being separable.

10. The winch according to claim 9 in which the magazine has a shaft between the end plates, the shaft having a first shaft part connected to the first end plate and a second shaft part connected to the second end plate.

11. The winch according to claim 10 in which one of the shaft parts has a threaded boss and the other shaft part has a threaded recess.

12. The winch according to claim 10 in which the shaft parts have cooperating engagement surfaces which are not threaded, the cooperating engagement surfaces being tapered with a taper angle of between around 15° and around 45°.

13. The winch according to claim 10 in which an outer surface of the first shaft part is tapering and an outer surface of the second shaft part is tapering.

14. The winch according to claim 13 in which the respective shaft parts taper inwardly from adjacent to the respective end plate to the position when the shaft parts meet.

15. The winch according to claim 13 in which a taper angle of the first and second shaft parts is between 10 and 20°.

16. The winch according to claim 1 in which the base includes a face plate and a pulley, the face plate having an opening.

17. The winch according to claim 16 in which the face plate has a bottom edge, and in which the opening is open-ended and is open to the bottom edge.

18. The winch according to claim 17 in which the bottom edge of the face plate is sharpened.

19. A method of using a winch according to claim 1 including the steps of:
- {i} mounting the winch to the boom of a vehicle by way of the mounting structure;
- {ii} transporting the winch to a site of use, the site of use having an access hole within which is located an open end of an underground pipe;
- {iii} suspending the winch above the access hole, with a longitudinal axis of the support column substantially vertical;
- {iv} rotating the base relative to the mounting structure to a chosen rotational position, and {v} lowering the base into the access hole to secure the base in the chosen rotational position.

* * * * *